United States Patent
Reddy Koki et al.

(10) Patent No.: US 10,459,737 B2
(45) Date of Patent: Oct. 29, 2019

(54) WAKING AND SLEEPING A DISPLAY AMONG A PLURALITY OF DISPLAYS USING GESTURES

(71) Applicant: Intel Corporation, Santa Clara, CA (US)

(72) Inventors: Tarakesava Reddy Koki, Bangalore (IN); Jagadish V. Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 15/711,977

(22) Filed: Sep. 21, 2017

(65) Prior Publication Data

US 2019/0087202 A1    Mar. 21, 2019

(51) Int. Cl.
| | | |
|---|---|---|
| G06F 1/32 | (2019.01) | |
| G06F 9/4401 | (2018.01) | |
| G06F 3/0486 | (2013.01) | |
| G06F 3/0488 | (2013.01) | |
| G06F 1/16 | (2006.01) | |
| G06F 1/3215 | (2019.01) | |
| G06F 1/3234 | (2019.01) | |

(52) U.S. Cl.
CPC .......... *G06F 9/4418* (2013.01); *G06F 1/1647* (2013.01); *G06F 1/3215* (2013.01); *G06F 1/3265* (2013.01); *G06F 3/0486* (2013.01); *G06F 3/04883* (2013.01); *G06F 3/04886* (2013.01); *G06F 2203/04806* (2013.01)

(58) Field of Classification Search
CPC .............................. G06F 1/3262; G06F 1/3265
See application file for complete search history.

(56) References Cited

U.S. PATENT DOCUMENTS

| | | | | |
|---|---|---|---|---|
| 2013/0050216 A1* | 2/2013 | Whitby-Strevens | .... | G06F 13/14 345/428 |
| 2014/0101578 A1* | 4/2014 | Kwak | ...... | G06F 3/017 715/761 |
| 2014/0313102 A1 | 10/2014 | Hennelly | | |
| 2015/0156143 A1* | 6/2015 | Chopde | .................. | H04L 51/04 715/752 |

(Continued)

FOREIGN PATENT DOCUMENTS

CN        103338302 B      10/2013

OTHER PUBLICATIONS

Vlad Bobleanta, Unwired View.com (BLOG (Feb. 15, 2011). Fujitsu is prepping an Android-powered dual-touchscreen smartphone Live pics and video from #MWC11 Retrieved on Feb. 5, 2018 from URL <<http://www.unwiredview.com/2011/02/15/fujitsu-is-prepping-an-android-powered-dual-touchscreen-smartphone-live-pics-and-video-from-mwc11/>>.

(Continued)

*Primary Examiner* — Albert Wang
(74) *Attorney, Agent, or Firm* — Schwabe, Williamson & Wyatt, P.C.

(57) ABSTRACT

The present disclosure describes a number of embodiments related to devices, systems, and methods related to a plurality of displays coupled to one or more processors to display images, and a device display manager to identify a gesture made on a first display of the plurality of displays, and to cause a second display to sleep or to wake based upon the identified gesture and a current state of the second display, where the first and second displays are different displays.

20 Claims, 7 Drawing Sheets

(56) References Cited

U.S. PATENT DOCUMENTS

2018/0129262 A1\* 5/2018 Veiga .................... G06F 1/162

OTHER PUBLICATIONS

Dual Monitor Software (2004).Retrieved on Feb. 4, 2018 from URL <<https://www.murgee.com/MurGeeMon/>>.
Laptop (Feb. 7, 2011) Hands-On with the Kyocera Echo dual-screen smart phone [YoutTube Video File] Retrieved on Feb. 5, 2018 from URL <<https://www.youtube.com/watch?v=VHqDzvIzCXU>>.

\* cited by examiner

Non-transitory computer-readable storage medium 702,
as may be implemented in embodiments of FIG. 5.

Programming instructions 704
to cause a multi-display device, in response to execution of the
instructions by a processor of the multi-display device, to practice
aspects of embodiments of the processes related to FIGs. 1-4B and 6.

WAKING AND SLEEPING A DISPLAY AMONG A PLURALITY OF DISPLAYS USING GESTURES

TECHNICAL FIELD

Embodiments of the present disclosure generally relate to the field of computing technology. More specifically, embodiments of the present disclosure relate to waking or sleeping one of a plurality of display devices based on gestures made on one or more of the display devices.

BACKGROUND

Over the last several years, there has been a steady increase in the number of multi-display devices, particularly in the mobile device space. Many of these devices include touch-sensitive displays that are used to interact with the one or more applications running on the device. If a multi-display device user wants to turn a display off or to put it into sleep mode to conserve battery power, the user typically uses a physical on/off switch associated with the display. For example, the switch may be near the display or on one of the sides of or on the front or back of a housing of the display. Some displays are embedded in housing units that sense when the display is moved, for example, when the display is closed like a clamshell, to cause the display to be turned off or put into sleep mode.

BRIEF DESCRIPTION OF THE DRAWINGS

Embodiments will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION

Figure 1:
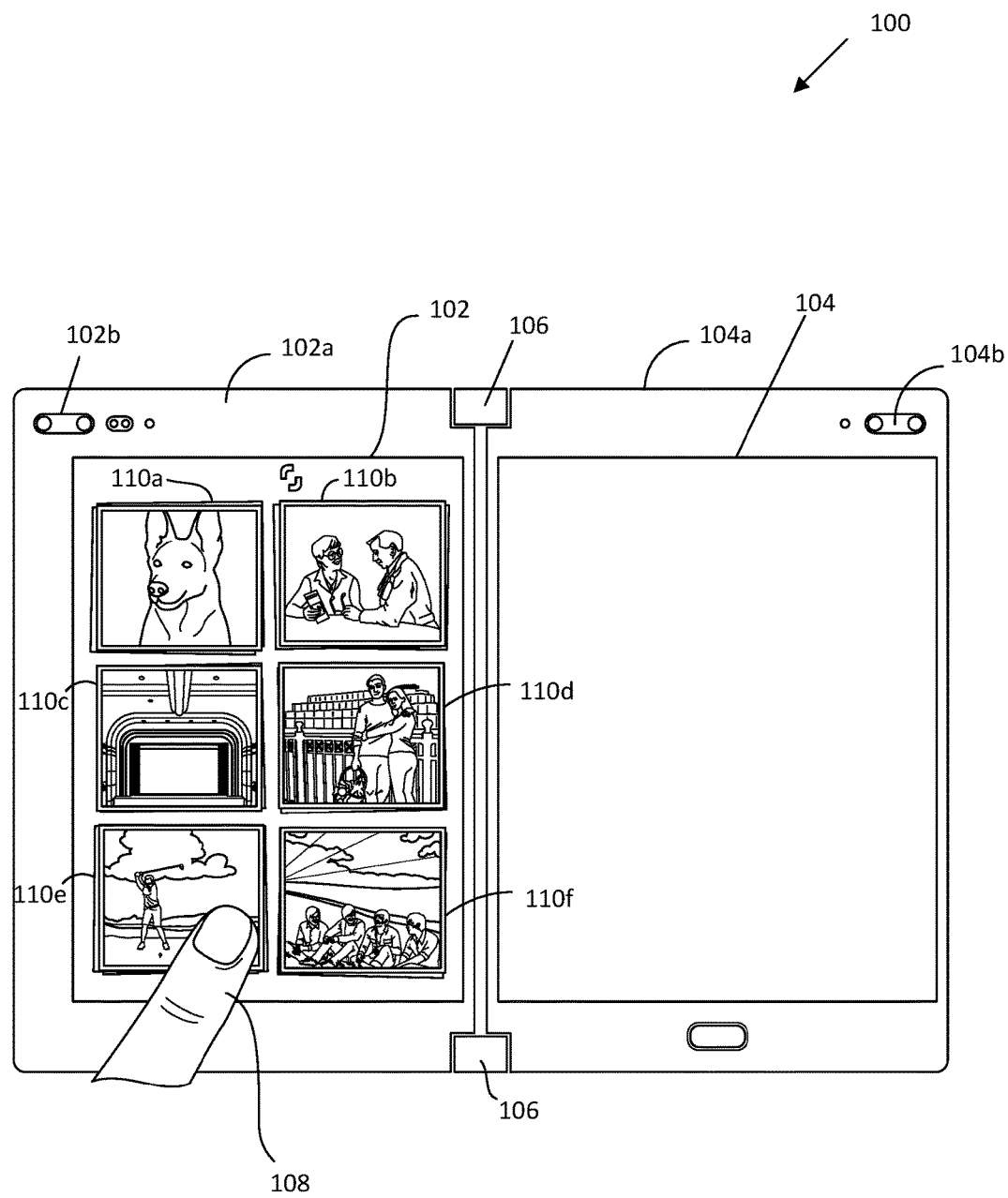
FIG. 1 illustrates an example device having two displays with one display awake and the other display asleep, in accordance with various embodiments.

Methods, apparatuses, and systems herein may be related to using gestures made on a first display of a multi-display device to cause a second display of the multi-display device to sleep or to wake based on the identified gesture and a current state of the second display. The first and second displays may be different displays. For example, when interacting with an application on a multi-display device, dragging or flicking a finger on a first (primary) display towards a second display may wake up the second display and display another image from the application. In another example, to turn off the second display, the user may drag or flick a finger on the second display toward the first display to put the second display into sleep mode. In variations of this example, the drag or flick of the finger on the second display may only put the second display into sleep mode if there are no other applications on the device displaying an image on the second display.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals may designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 illustrates an example device having two displays with one display awake and the other display asleep, in accordance with various embodiments. Diagram 100 may be a computing device that has a first display 102, which may also be referred to as a primary display, and a second display 104. In embodiments, the two displays 102, 104 may be respectively within their own housings 102a, 104a. In embodiments, there may be more than two displays. One or more computers (not shown) may be included within the housing 102a, 104a to run applications or to cause one or more images to appear on the first display 102 or the second display 104.

In embodiments, the displays 102, 104 may be connected by a hinge mechanism 106 that may allow the locations of the displays 102, 104 relative to each other to be changed. In embodiments, the two displays 102, 104 may be detached from each other. In embodiments, there may be more than two displays, where any one of the displays may be considered as a primary display, and one or more of the other displays may be considered a secondary display.

The displays 102, 104 may have on-off switches 102b, 104b, that may be used to physically turn off the respective displays. In embodiments, the on-off switches 102b, 104b may be in other locations. In embodiments, a display 102, 104 may be in a wake state or "awake" or in a sleep state "asleep." As used herein, a display in a sleep state may be awakened, and a display in a wake state may be put to sleep. A display in a sleep state may consume little to no power, thereby conserving the battery charge or the battery life of the computing device 100. In legacy implementations, a user may put a display in a sleep state by physically touching an on-off switch 104b, or the display may have an auto-lock type feature where, for example, if the contents of the display do not change over a period of time, the display may be automatically put to sleep.

Turning back now towards embodiments, there may be times when the user wishes to have both displays 102, 104 facing the user. This may be preferred when the device is on the user's lap or on a table in front of the user, or when the user does not want to fold back the second display 104 behind the first display 102 due to possible scratches or other damage to the second display 104. In such cases, the user may want to keep the displays 102, 104 facing the user even though one of the displays may be asleep. In embodiments, this may also be useful when using the device 100 in a dark setting and the user wishes to minimize the amount of light produced by the device 100, for example, when using the device 100 during overnight flights.

The experience of using the computing device 100 may be greatly enhanced by using intuitive gestures that may allow the user to wake or to sleep the second display 104 while interacting with an application running on the computing device 100, and doing so without having to press an on-off switch 104b. In embodiments, whether the second display 104 is asleep or awake may depend on the operation of an application running on the computing device 100 that may be using the first display 102 as the primary display. For example, if the first display is a touch display, the user may interact with the primary display 102 using a swipe, flick, tap, or other gesture interacting with the application to awaken display 104 and to display one or more images. This may include expanding an image across the second display 104, or providing additional detail from an application, such as opening an email window or opening a window to provide information and trivia for a movie playing on the first display 102. In another example, the user may interact with either the primary display 102 or the second display 104 using a swipe, flick, tap or other gesture to indicate to the application it should cause an image to be no longer displayed on the second display 104 and the second display 104 should go to sleep.

The first display 102 may include a number of images 110a-110f presented by an application running on the computing device 100. The second display 104 may be asleep and may be drawing little to no power. A user's finger 108 may be used to touch the display 102 and make a gesture to interact with the application as described further below for FIGS. 2A-2B. In embodiments, the second display 104 may be woken up or put to sleep by a device display manager (DDM) that may work in conjunction with applications on the device 100. An example DDM is described more fully below, including at diagram 500 of FIG. 5 and process 600 of FIG. 6.

Figure 2A:
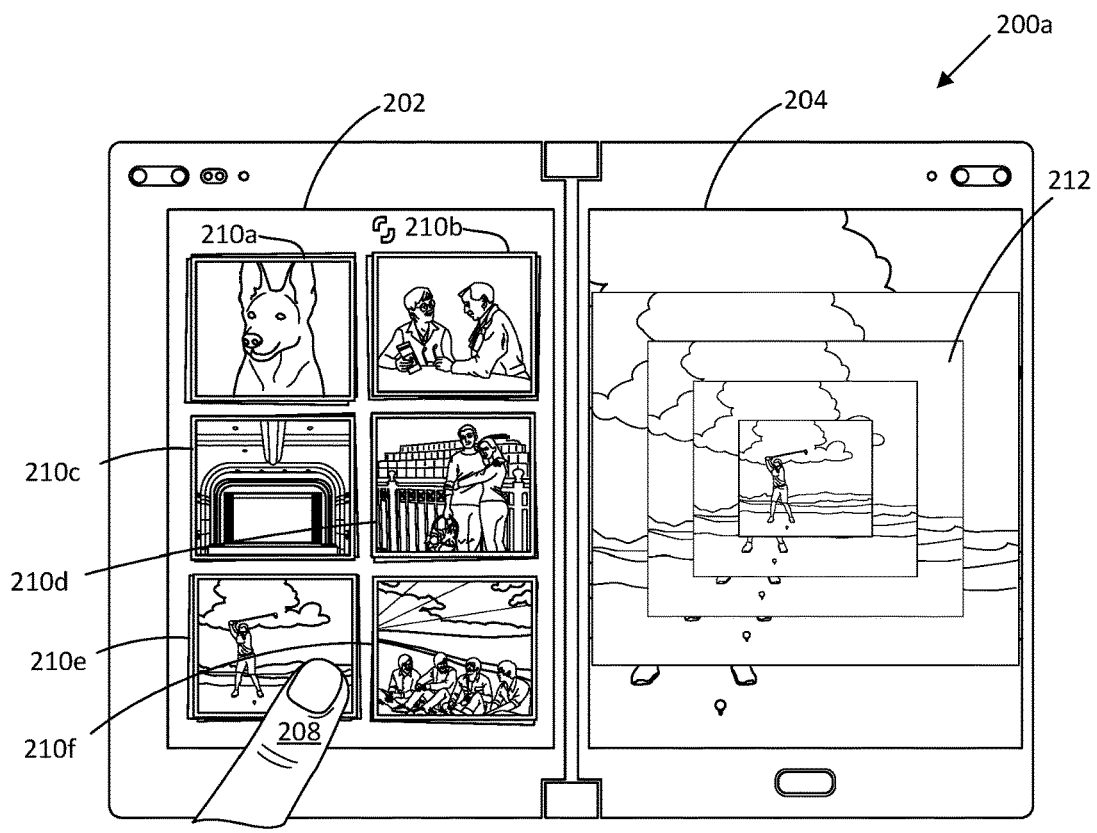
FIGS. 2A-2B illustrate an example device where gestures on one display wake a second display and put the second display back to sleep, in accordance with various embodiments.
Figure 2B:
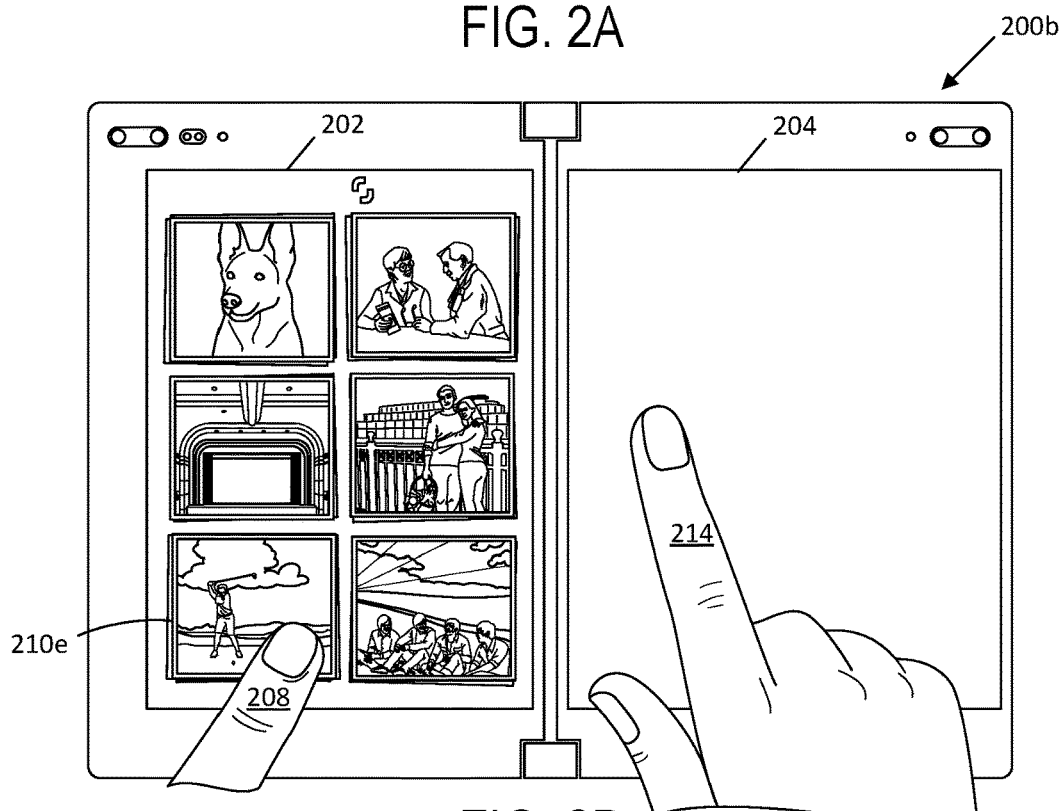

FIGS. 2A-2B illustrate an example device where gestures on one display wake a second display and put the second display back to sleep, in accordance with various embodiments. FIGS. 2A-2B shows a scenario where a user has opened a photo gallery application on the first display 202 and now wants to open one of the photos 210e, which may be similar to photo 110e of FIG. 1, on the secondary display 204 for greater detail. The user may tap on, flick or drag the photo, using the touchscreen display, from the first display 202 to the secondary display 204.

FIG. 2A shows diagram 200a, which may be a computing device similar to diagram 100. A first display 202 and the images 210a-210f on the first display 202, as well as the second display 204 and user finger 208, may be similar to first display 102, second display 104, the images 110a-110f, and the user finger 108 of FIG. 1.

In embodiments, the user finger 208 may perform a single tap, double tap, right swipe, right flick, or some other gesture on or near the image 210e on display 202. As a result, the application is to display the image 212, in this case a golfer in mid-swing, as a full rendering of smaller image 210e and may awaken screen 204 to display the full rendering. After the image 212 is displayed, the user may move his or her finger 208 to different areas on display 202 to bring up other images on the second display 204. The user may move finger 208 to various locations on the second display 204 to otherwise manipulate the image 212 that is displayed.

Figure 5:
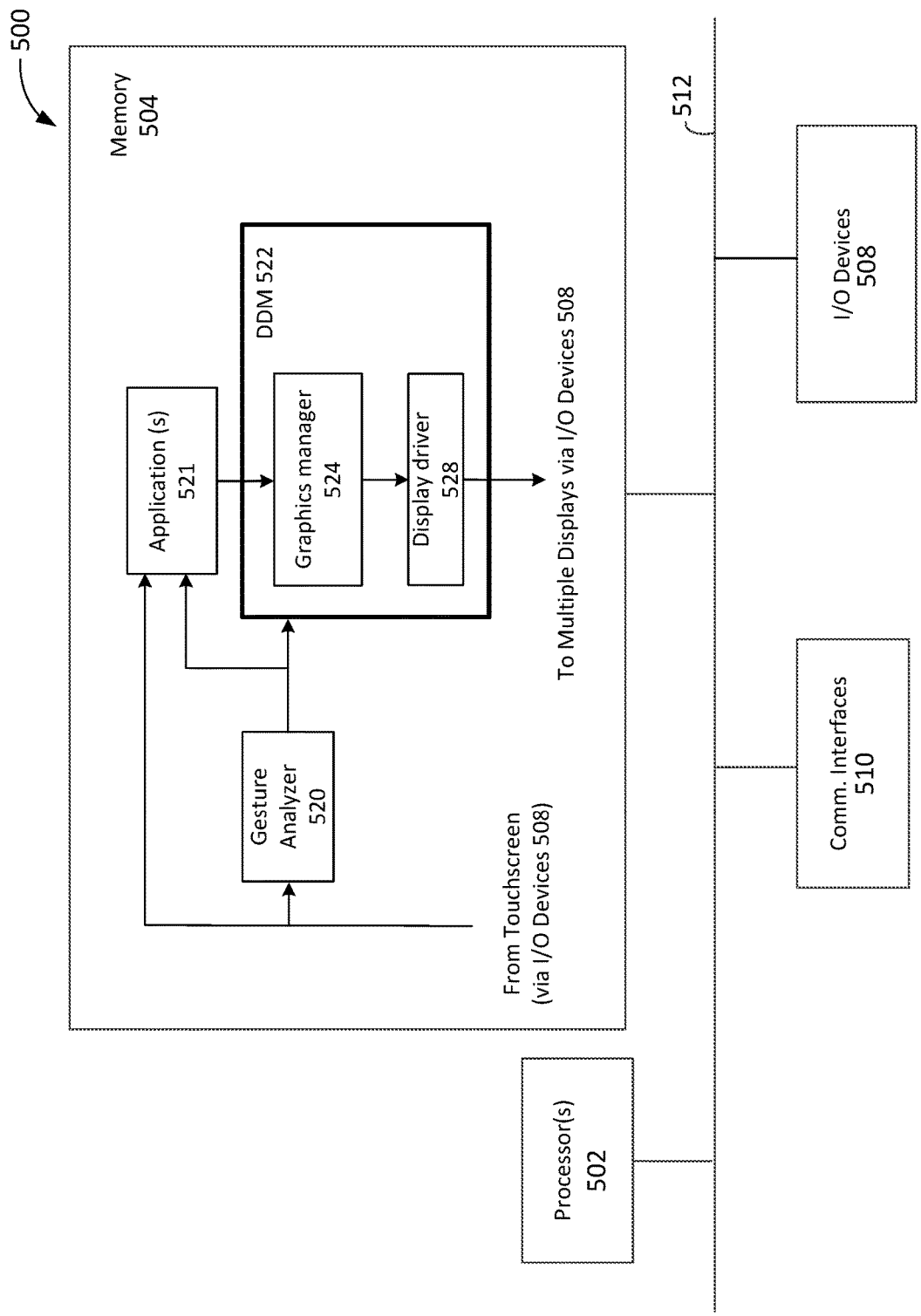
FIG. 5 is a block diagram illustrating various components of an example device display manager, in accordance with various embodiments.

In embodiments, a DDM, e.g., DDM 522 of FIG. 5, may receive a request from the application, such as application 521 of FIG. 5, to display the image 212 on the second display 204. The DDM may determine if the second display 204 is asleep and if so send it a command to wake up. In embodiments, this wake command may be sent through a DisplayPort (DP) auxiliary (AUX) channel or some equivalent sideband signaling. The secondary display panel may then wake up and display the image from the application (e.g., the image 212) while the primary screen may continue to show the gallery of photos 210a-210f.

FIG. 2B shows diagram 200b, which may be a computing device similar to diagram 200a. However, image 212 is no longer displayed on second display 204, which has been put to sleep. In embodiments, this may have been accomplished by a swipe or a flick of finger 208 in a direction away from the second screen 204, or in some other direction or through some other gesture. In embodiments, the second display 204 may have been put to sleep by the DDM when it received information from the application that the image 212 was no longer to be displayed. The application may have determined this based on a movement of finger 214, for example, in a swiping or a flicking motion toward the first display 202, or in some other direction.

As shown in FIG. 2B, the second screen 204 has been put to sleep after the user has indicated with finger motions 208, 214 that the image 212 was no longer to be displayed. In other embodiments, if there had been another application running on the computing device 200a displaying a second image (not shown) on the second display 204, i.e., behind the image 212, the second screen 204 may not be put to sleep. The DDM may have tracked the images to be displayed on the second display 204, and determined that the second image should still be displayed and the second display 204 should not be put to sleep.

In embodiments, the application on the displays 202, 204 may allow a number of different gestures to be identified that may indicate to the application or to the DDM whether the image 212 is to be no longer displayed and the display 204 is to be put to sleep.

Figure 3A:
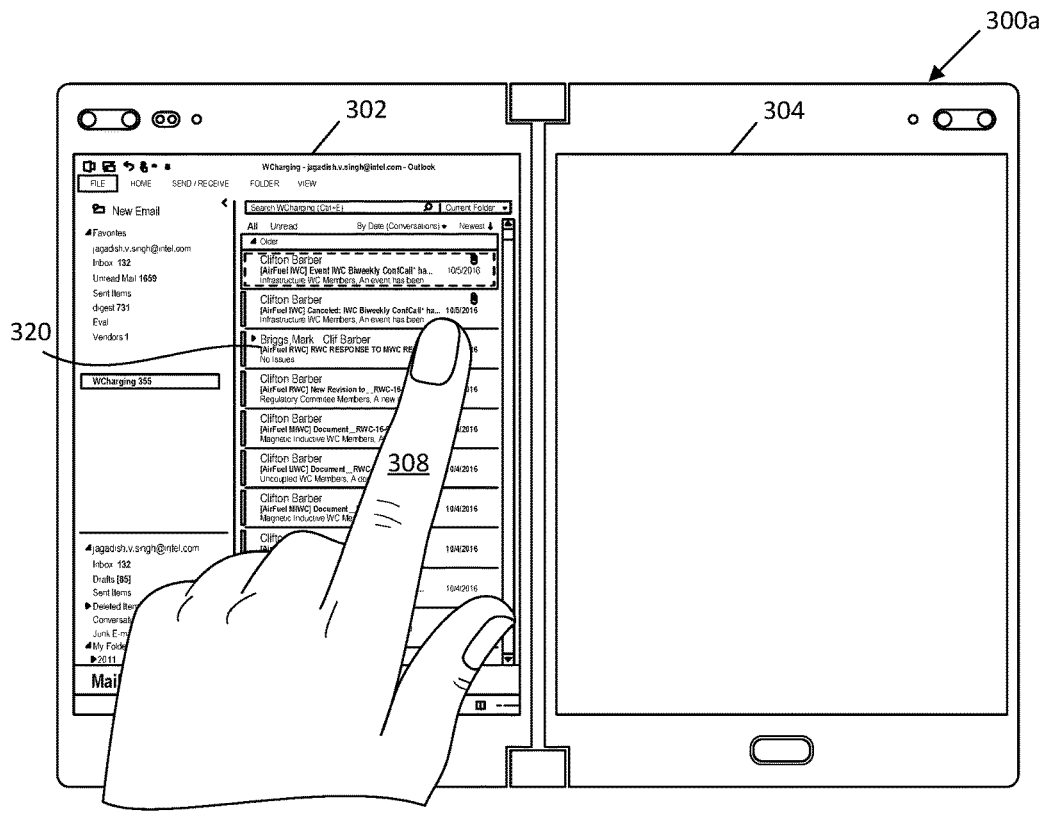
FIGS. 3A-3B illustrate an example device where gestures interacting with an application running on the device wake a second display and put the second display back to sleep, in accordance with various embodiments.
Figure 3B:
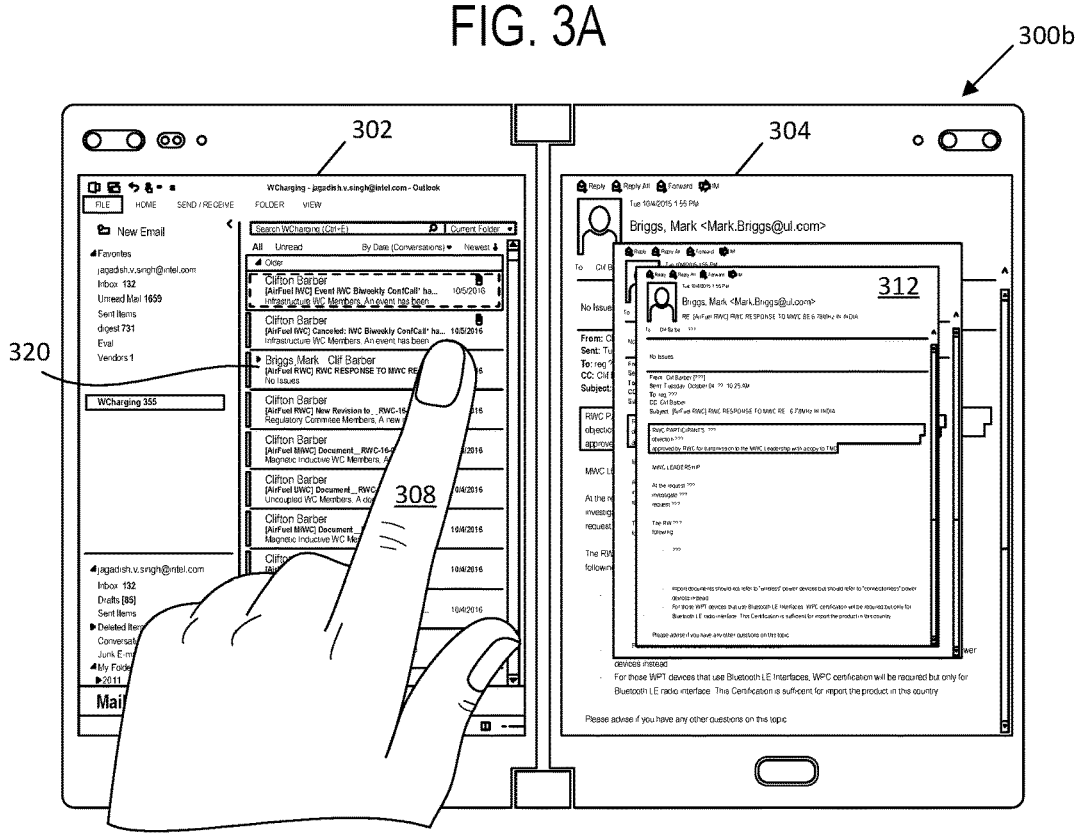

FIGS. 3A-3B illustrates an example device where gestures interacting with an application running on the device wake a second display and put the second display back to sleep, in accordance with various embodiments. In FIG. 3A, diagram 300a shows a computing device that may have a first display 302 and a second display 304, which may be similar to displays 202, 204 of FIG. 2.

The display 302 may be running an electronic mail (email) application operated with the user's fingers 308. When the email application is first opened, it may provide images only to the first display 302. In embodiments, the email application may include selectable areas 320 on the first display 302 that may, when selected, awaken the second display 304 if not awake and display information relevant to the selectable area 320.

FIG. 3B shows diagram 300b that may be the result of the user touching the selectable area 320. In embodiments, selectable area 320 may be a summary of an incoming email. When the user does a swipe-right or makes some other gesture to select the area 320, an image 312 of the full email may appear on the second display 304. The user may then scroll image 312 up and down the second display 304 to read the email message, or may interact with it in some other way. In embodiments, the user may reply to or forward the email message by selecting an area on the image 312. When the user is through reading the email message, the user may, for example, touch the selectable area 320, or may swipe left on second display 304 using finger 308. In embodiments, the finger 308 motions referred to above may include any motion or gesture pattern.

In embodiments, an application may be configured to start in a dual screen mode, for example, having first display 302 and second display 304 awake and displaying portions of the application.

Figure 4A:
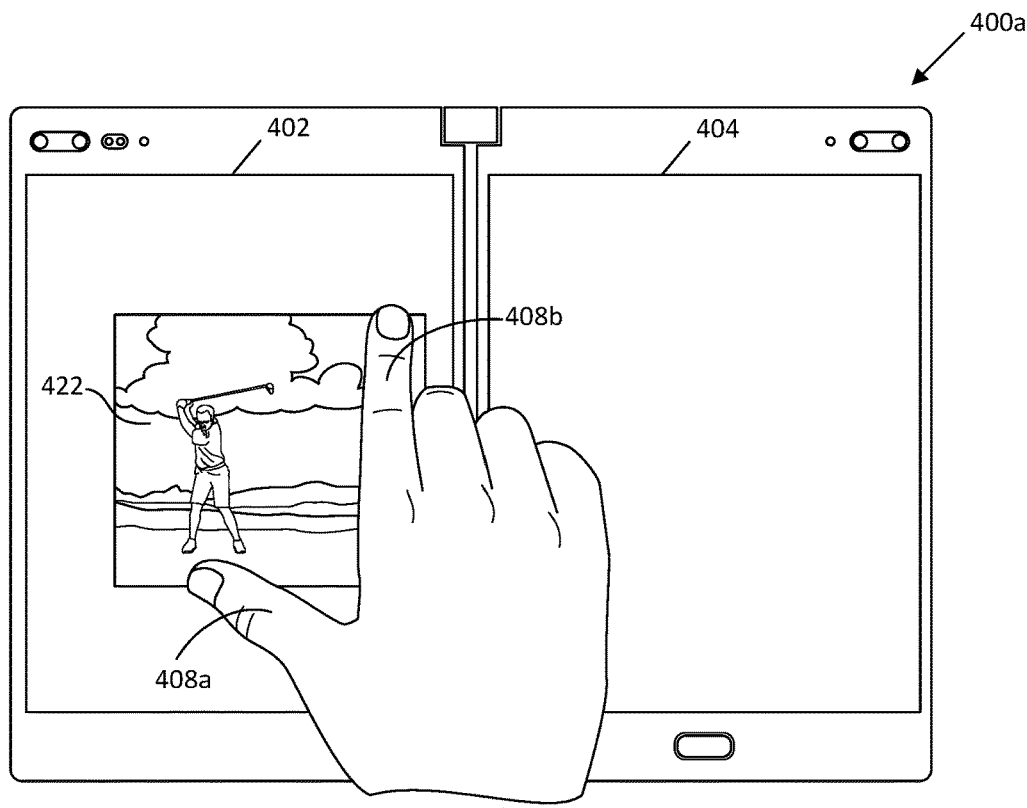
FIGS. 4A-4B illustrate an example device where gestures on one display wake a second display and zoom the image on the first display across the first and second displays, in accordance with various embodiments.
Figure 4B:
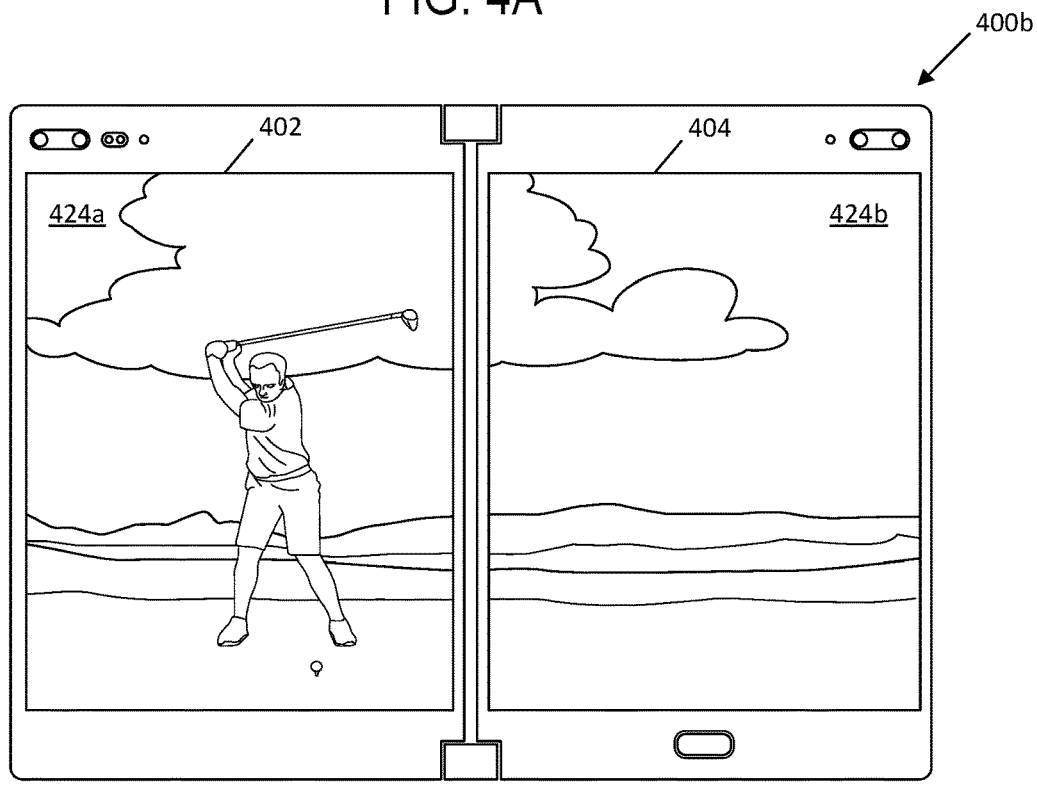

FIGS. 4A-4B illustrate an example device where gestures on one display wake a second display and zoom the image on the first display across the first and second displays, in accordance with various embodiments. FIG. 4A shows diagram 400a showing a computing device that may have a first display 402 and a second display 404, which may be similar to displays 202, 204 of FIG. 2.

The display 402 may show an image 422 from an application running on the computing device 400a. A user may wish to zoom the image across both displays 402, 404. To do this, the user may use gestures with thumb 408a and finger 408b to indicate a zooming instruction to be applied to image 422. For example, the user may spread the tip of the thumb 408a and the tip of the finger 408b in opposite directions.

FIG. 4B shows diagram 400b that may be the result of the zooming action described above. Here, the image 422 has been zoomed to expand image 422 across the first display 402 and the second display 404. A portion of image 422 may appear as image 424a on display 402, and the other portion of image 422 may appear as image 424b across the second display 404.

In embodiments, when the user is done using the image 424b on the second display 404, the user may use a finger (not shown) to flick or drag the image from the second display 404 to the first display 402. Depending upon the application running on a computing device 400b that is displaying the image 424b, the application may remove the entire image 424b. A DDM, e.g., DDM 522 of FIG. 5, may then be notified that the image 424b has been removed and that the application no longer needs the second display 404. In embodiments, the DDM may then put the second display 404 to sleep provided no other application is displaying an image on the second display 404.

In embodiments, an application running on the computing device 400b may have multiple images on the display. A user may make a gesture to indicate that all of the images from the second display 404 are to be sent to the first display 402 or are to be otherwise closed on the second display 404, then the DDM may be notified and put the second display 404 to sleep.

The examples shown and discussed above from FIGS. 1-4B are just a few examples of the many applications that may take advantage of putting an unused second display 404 to sleep. Other examples may include social media applications where details may be shown on a second display 404 or videoconferencing applications where materials or an image of the person currently talking may be put on the second display 404. Applications may include video editing or the second display 404 may display a video segment to be edited or may display live video by a camera (not shown) in the computing device 400b to be captured. Other applications may include office applications, or gaming applications.

FIG. 5 is a block diagram illustrating various components of an example device display manager, in accordance with various embodiments. As shown, the example computing device 500 may be suitable to implement the functionalities associated with diagrams 100, 200a, 200b, 300a, 300b, 400a, 400b, or 600. As shown, computing device 500 may include one or more processors 502, each having one or more processor cores, and system memory 504.

The processor 502 may include any type of unicore or multi-core processors. Each processor core may include a central processing unit (CPU), and one or more level of caches. The processor 502 may be implemented as an integrated circuit. The computing device 500 may include mass storage devices (not shown) such as diskette, hard drive, or volatile memory (e.g., dynamic random access memory (DRAM)), compact disc read only memory (CD-ROM), digital versatile disk (DVD) and so forth).

The computing device 500 may further include input/output (I/O) devices 508 such as multiple displays, keyboard, cursor control (including touch displays), remote control, gaming controller, image capture device, and so forth, and communication interfaces 510 (such as network interface cards, modems, infrared receivers, transceivers, radio receivers (e.g., Bluetooth), and so forth). I/O devices 508 may be suitable for communicative connections with a first display 102 and a second display 104 of FIG. 1. These communicative connections may be used to cause a second display 104 to wake or to sleep depending upon gestures the user may make on the first display 102 or on the second display 104, and the current state of the second display 104, as may be described in reference to FIGS. 1-4B and 6. In embodiments, the communicative connections may include a DP AUX channel or some equivalent sideband signaling.

The communication interfaces 510 may include communication chips (not shown) that may be configured to operate the device 500 in accordance with wired or with wireless protocols in other embodiments. The communication interfaces 510 may be used to facilitate communication over the Internet.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices (not shown) may be employed to store a working copy and a permanent copy of the programming instructions implementing the operations and functionalities associated with the DDM 522, Gesture Analyzer (GA) 520, and one or more application (Applications) 521 of FIG. 5. In embodiments, the DDM 522 may include a Graphics manager 524, and/or display driver 528. The DDM 522, GA 520, and applications 521 may be implemented by assembler instructions supported by processor(s) 502 or high-level languages that may be compiled into such instructions.

In embodiments, a Gesture Analyzer (GA) 520 may interact with application modules 521, and DDM 522. The GA may receive user input from I/O devices such as first display 102 or second display 104 that may be touch displays on which a user may make gestures such as movements or flicks with a finger or a stylus. The GA 520 may analyze the inputs, and base on a result of the analysis, identify a specific gesture, for example a gesture to wake or to sleep a first display 102 or a second display 104. The identified gesture may then be communicated to the one or more Applications 521 and/or to the DDM 522, and e.g, to the graphics manager 524 or display driver 528 within the DDM 522. Graphics manager 524 in general may be configured to generate the graphics associated with outputs of applications 521, including in embodiments, windows management. Display driver 528, in general, may be configured to render the graphics onto the multiple displays, including in embodiments, powering the multiple displays on/off, putting active one(s) of the multiple displays to sleep and/or waking sleeping one(s) of the multiple displays. In embodiments, the communication of the gesture may then cause the graphics manager 524 and/or display driver 528 to change the images rendered on, or to cause to wake or sleep the first display 102 or second display 104.

In embodiments, Applications 521 may include custom developed or standard applications such as Microsoft® Office™, web browsers, downloadable apps, or some other application that runs on computing device 500. Applications 521 may display images on a first display 102 or second display 104 by communicating with the DDM 522. In embodiments, applications 521, in addition to receiving other user input, may also identify gestures the user has made on the first display 102 or the second display 104 Identifying these gestures may indicate to the one of the applications 521 that a new image is to be displayed on a second display 104, and send that image to the DDM 522 for processing.

For example, a swipe on an email summary line toward the second display 104 may indicate to an email application, which may be one of the Applications 521, that it is to cause an image of the full email to appear on the second display 104. As a result, the email application may send an indication to the DDM 522 to display a full email image to be displayed on the second display 104. As a result, the DDM 522 may determine whether the second display 104 is asleep, and if it is, to issue a command to wake the second display 104 and display the image. Related to this example, if the email application determines that a user makes a swipe gesture on the full email image on the second display 104 toward the first display 102, the email application may send a request to the DDM 522 to no longer display the email image. If there are no other images to display of the second display 104, the DDM 522 may cause the second display 104 to go to sleep.

In embodiments, applications 521 may also receive gesture information from the GA 520. The GA 520 may send one or more commands to an application 521 that may cause the application to display one or more image on a second display 104. In some embodiments, the application 521 may determine the status of the second display 104 or determine the image to be displayed on the second display 104. In embodiments, the application 521 may send commands to the graphics manager 524 within the DDM 522 to wake and to display an image on the second display 104. For example, the graphics manager 524 may run at an operating system-level and be aware of a second application 524 that may be displaying images on the second display 104. In these examples, the graphics manager 524 may cause the image of the first application 521 displayed on the second display 104 to be closed, but may not cause the second display 104 to sleep. In other examples, if there is only one application 521 and the gesture analyzer 520 identifies a gesture that is to cause an image on the second display 104 to close, then the graphics manager 524 may cause the second display 104 to sleep by sending a command to the display driver 528.

The DDM 522 may perform one or more of the functions associated with diagrams 100, 200a, 200b, 300a, 300b, 400a, 400b, or 600. In embodiments, the DDM 522 may be associated with the functions of waking or sleeping the second display 104 based upon a state of the second display and gestures received by a user on the first and the second display. It may control the images displayed on the second display 104. These gestures may be received from an input device, for example touch display 102, 104 of FIG. 1, via I/O Devices 508 and identified using the gesture analyzer 520 or an application 521 as described above. In embodiments, the gesture analyzer 550 may identify the specific gesture that may signify a change in the image displayed on or the status of a second display such as display 104 of FIG. 1.

The permanent copy of the programming instructions may be placed into mass storage devices (not shown) in the factory, or in the field, through, for example, a distribution medium (not shown), such as a compact disc (CD), or through communication interfaces 510 (from a distribution server (not shown)).

Figure 6:
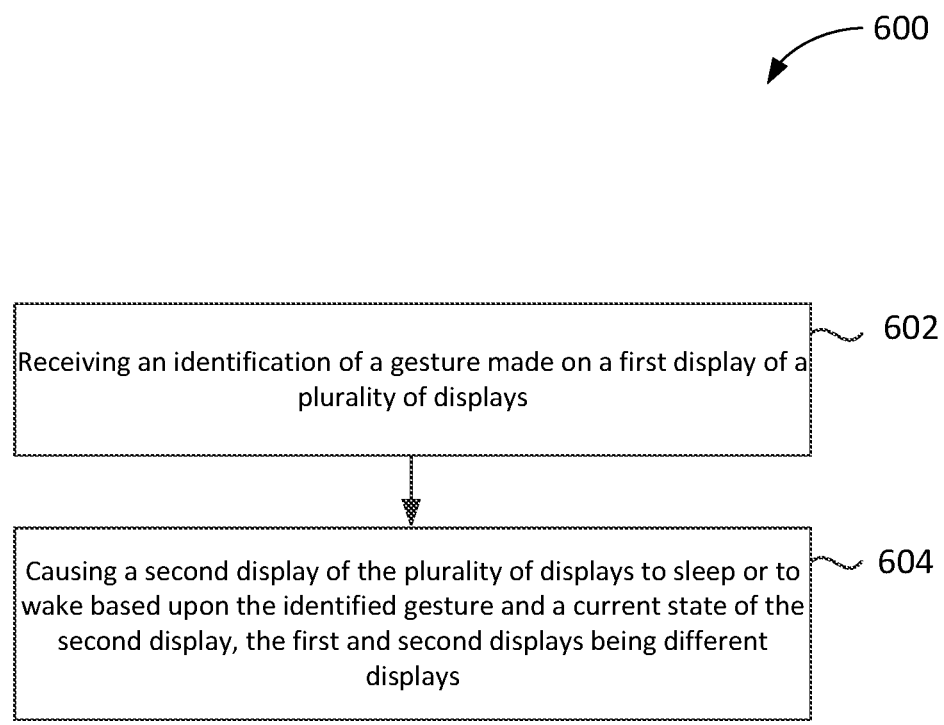
FIG. 6 is a block diagram that illustrates an example process for waking and sleeping a plurality of displays based upon gestures made on one or more of those displays, in accordance with various embodiments.

FIG. 6 is a block diagram that illustrates a process for waking and sleeping a plurality of displays based upon gestures made on one or more of those displays, in accordance with various embodiments. In various embodiments, the DDM 522 (e.g., graphics manager 524 or display driver 538), GA 520, and/or applications 521, running on computing devices 100, 200a, 200b, 300a, 300b, 400a, 400b, or 500 may perform a portion of, or one or more of, the processes as described in diagram 600.

At block 602, the process may include receiving an identification of a gesture made on a first display of a plurality of displays. In embodiments, the gesture may be identified using GA 520, or may be identified by one of the applications 521. The gesture may be a finger tap, a finger double tap, a finger swipe, a finger flick, or some other gesture that may be made on a touch display. In embodiments, the gesture may include motion, for example, a motion on the first display, such as first display 102 of FIG. 1 towards second display 104. Identifying the gesture may also include where on the display the gesture is being made, in addition to the motion of the gesture. For example, in the electronic mail example of FIG. 3, a swipe-right motion made on first display 302 at a location other than location 320 may open a different electronic mail message in the second display 304.

At block 604, the process may include causing a second display of the plurality of displays to sleep or to wake based upon the identified gesture and a current state of the second display, the first and second displays being different displays. In embodiments, the DDM 522 (e.g., using graphics manager 524 or display driver 538) may track the state of the second display, for example, whether the second display is awake or asleep.

In embodiments, if the identified gesture indicates that the second display is to sleep and a state of the second display is awake, then the process may cause the second display to sleep. If the identified gesture indicates that the second display is to awake and a state of the second display is asleep, then the process may cause the second display to wake. If the identified gesture indicates to an application to display an image on the second display and a state of the second display is asleep, then the process may cause the second display to wake. If the identified gesture indicates to an application to no longer display an image on the second display and a state of the second display is awake, then the process may cause the second display to sleep. Alternatively, if the identified gesture indicates to an application to no longer display an image on the second display, the process may cause the second display to sleep unless the application or another application running on the one or more processors is to display another image on the second display.

Figure 7:
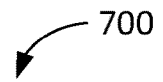
FIG. 7 is a diagram illustrating computer-readable media having instructions for practicing the above-described techniques, or for programming/causing systems and devices to perform the above-described techniques, in accordance with various embodiments.

FIG. 7 is a diagram illustrating computer-readable media having instructions for practicing the above-describe techniques, or for programming/causing systems and devices to perform the above-describe techniques, in accordance with various embodiments. In various embodiments, such computer-readable media 702 may be included in a memory or storage device, which may be transitory or non-transitory, such as memory 504. In embodiments, instructions 704 may include assembler instructions supported by a processing device, or may include instructions in a high-level language, such as C, that can be compiled into object code executable by the processing device. In some embodiments, a persistent copy of the computer-readable instructions 704 may be placed into a persistent storage device in the factory or in the field (through, for example, a machine-accessible distribution medium (not shown)). In various embodiments, a persistent copy of the computer-readable instructions 704 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus comprising: one or more processors; a plurality of displays communicatively coupled to the one or more processors to display images; and a device display manager (DDM) communicatively coupled to the one or more processors to: receive an identification of a gesture made on a first display; and cause a second display to sleep or to wake based upon the identified gesture and a current state of the second display, the first and second displays being different displays.

Example 2 may include the subject matter of Example 1, wherein if the identified gesture indicates that the second display is to sleep and a state of the second display is awake, then the DDM is further to cause the second display to sleep.

Example 3 may include the subject matter of Example 1, wherein if the identified gesture indicates that the second display is to awake and a state of the second display is asleep, then the DDM is further to cause the second display to wake.

Example 4 may include the subject matter of Example 1, wherein if the identified gesture indicates to an application to display an image on the second display and a state of the second display is asleep, then the DDM is to cause the second display to wake.

Example 5 may include the subject matter of Example 1, wherein if the identified gesture indicates to an application to no longer display an image on the second display and a state of the second display is awake, then the DDM is to cause the second display to sleep.

Example 6 may include the subject matter of Example 5, wherein to cause the second display to sleep further includes to cause the second display to sleep unless the application or another application running on the one or more processors is to display another image on the second display.

Example 7 may include the subject matter of any Examples 1-6, wherein the image is a plurality of images.

Example 8 may include the subject matter of any Examples 1-6, wherein the second display is a subset of the plurality of displays.

Example 9 may include the subject matter of any Examples 1-6, wherein the first and/or the second display is a touch display.

Example 10 may include the subject matter of any Examples 1-6, wherein the gesture includes a swipe toward or away from the first display or the second display; a flick toward or away from the first display or the second display; a drag toward or away from the first display or the second display, a tap, or a multi-tap.

Example 11 may include the subject matter of any Examples 1-6, wherein to cause the second display to wake or to sleep further includes to transmit one or more commands to the second display through a DisplayPort (DP) auxiliary (AUX) channel or through sideband signaling.

Example 12 may include the subject matter of any Examples 1-6, wherein the current state of the second display is identified by the DDM.

Example 13 may include the subject matter of Example 1, wherein the gesture is made on the second display towards the first display.

Example 14 may include the subject matter of Example 13, further comprising cause an image displayed on the first display to be changed.

Example 15 may include the subject matter of Example 1, wherein the DDM further comprises a gesture analyzer to identify a gesture made on the first display or on a second display.

Example 16 may be a method for controlling a display, comprising, identifying a gesture made on a first display of a plurality of displays; and causing a second display of the plurality of displays to sleep or to wake based upon the identified gesture and a current state of the second display, the first and second displays being different displays.

Example 17 may include the subject matter of Example 16, wherein causing a second display of the plurality of displays to sleep or to wake further includes if the identified gesture indicates that the second display is to sleep and a state of the second display is awake, then causing the second display to sleep.

Example 18 may include the subject matter of Example 16, wherein causing a second display of the plurality of displays to sleep or to wake further includes if the identified gesture indicates that the second display is to awake and a state of the second display is asleep, then causing the second display to wake.

Example 19 may include the subject matter of Example 16, wherein causing a second display of the plurality of displays to sleep or to wake further includes if the identified gesture indicates to an application to display an image on the second display and a state of the second display is asleep, then causing the second display to wake.

Example 20 may include the subject matter of Example 16, wherein causing a second display of the plurality of displays to sleep or to wake further includes if the identified gesture indicates to an application to no longer display an image on the second display and a state of the second display is awake, then causing the second display to sleep.

Example 21 may include the subject matter of Example 20, wherein causing the second display to sleep further includes causing the second display to sleep unless the application or another application running on the one or more processors is to display another image on the second display.

Example 22 may include the subject matter of any Examples 16-21, wherein the image is a plurality of images.

Example 23 may include the subject matter of any Examples 16-21, wherein the second display is a subset of the plurality of displays.

Example 24 may include the subject matter of any Examples 16-21, wherein the first and/or the second display is a touch display.

Example 25 may include the subject matter of any Examples 16-21, wherein the gesture includes a swipe toward or away from the first display or the second display; a flick toward or away from the first display or the second display; a drag toward or away from the first display or the second display, a tap, or a multi-tap.

Example 26 may include the subject matter of any Examples 16-21, wherein causing the second display to wake or to sleep further includes transmitting one or more commands to the second display through a DisplayPort (DP) auxiliary (AUX) channel or through sideband signaling.

Example 27 may include the subject matter of any Examples 16-21, further comprising identifying the current state of the second display.

Example 28 may include the subject matter of Example 16, wherein the gesture is made on the second display towards the first display.

Example 29 may include the subject matter of Example 28, further comprising causing an image displayed on the first display to be changed.

Example 30 may include the subject matter of Example 16, further comprising identifying a gesture made on the first display or on the second display.

Example 31 may be one or more computer-readable media comprising instructions that cause a computing device, in response to execution of the instructions by the computing device, to: identify a gesture made on a first display of a plurality of displays; and cause a second display of the plurality of displays to sleep or to wake based upon the identified gesture and a current state of the second display, the first and second displays being different displays.

Example 32 may include the subject matter of Example 31, wherein to cause a second display of the plurality of displays to sleep or to wake further includes if the identified gesture indicates that the second display is to sleep and a state of the second display is awake, then to cause the second display to sleep.

Example 33 may include the subject matter of Example 31, wherein to cause a second display of the plurality of displays to sleep or to wake further includes if the identified gesture indicates that the second display is to awake and a state of the second display is asleep, then to cause the second display to wake.

Example 34 may include the subject matter of Example 31, wherein to cause a second display of the plurality of displays to sleep or to wake further includes if the identified gesture indicates to an application to display an image on the second display and a state of the second display is asleep, then to cause the second display to wake.

Example 35 may include the subject matter of Example 31, wherein to cause a second display of the plurality of displays to sleep or to wake further includes if the identified gesture indicates to an application to no longer display an image on the second display and a state of the second display is awake, then to cause the second display to sleep.

Example 36 may include the subject matter of Example 35, wherein to cause the second display to sleep further includes to cause the second display to sleep unless the application or another application running on the one or more processors is to display another image on the second display.

Example 37 may include the subject matter of any Examples 31-36, wherein the image is a plurality of images.

Example 38 may include the subject matter of any Examples 31-36, wherein the second display is a subset of the plurality of displays.

Example 39 may include the subject matter of any Examples 31-36, wherein the first and/or the second display is a touch display.

Example 40 may include the subject matter of any Examples 31-36, wherein the gesture includes a swipe toward or away from the first display or the second display; a flick toward or away from the first display or the second display; a drag toward or away from the first display or the second display, a tap, or a multi-tap.

Example 41 may include the subject matter of any Examples 31-36, wherein to cause the second display to wake or to sleep further includes to transmit one or more commands to the second display through a DisplayPort (DP) auxiliary (AUX) channel or through sideband signaling.

Example 42 may include the subject matter of any Examples 31-36, further comprising to identify the current state of the second display.

Example 43 may include the subject matter of any Examples 31-36, wherein the gesture is made on the second display towards the first display.

Example 44 may include the subject matter of Example 43, further comprising causing an image displayed on the first display to be changed.

Example 45 may include the subject matter of Example 31, further comprising to identify a gesture made on the first display or on the second display.

Example 46 may be an apparatus comprising: means for identifying a gesture made on a first display of a plurality of displays; and means for causing a second display of the plurality of displays to sleep or to wake based upon the identified gesture and a current state of the second display, the first and second displays being different displays.

Example 47 may include the subject matter of Example 46, wherein means for causing a second display of the plurality of displays to sleep or to wake further includes if the identified gesture indicates that the second display is to sleep and a state of the second display is awake, then means for causing the second display to sleep.

Example 48 may include the subject matter of Example 46, wherein means for causing a second display of the plurality of displays to sleep or to wake further includes if the identified gesture indicates that the second display is to awake and a state of the second display is asleep, then means for causing the second display to wake.

Example 49 may include the subject matter of Example 46, wherein means for causing a second display of the plurality of displays to sleep or to wake further includes if the identified gesture indicates to an application to display an image on the second display and a state of the second display is asleep, then means for causing the second display to wake.

Example 50 may include the subject matter of Example 46, wherein means for causing a second display of the plurality of displays to sleep or to wake further includes if the identified gesture indicates to an application to no longer display an image on the second display and a state of the second display is awake, then means for causing the second display to sleep.

Example 51 may include the subject matter of Example 50, wherein means for causing the second display to sleep further includes means for causing the second display to sleep unless the application or another application running on the one or more processors is to display another image on the second display.

Example 52 may include the subject matter of any Examples 46-51, wherein the image is a plurality of images.

Example 53 may include the subject matter of any Examples 46-51, wherein the second display is a subset of the plurality of displays.

Example 54 may include the subject matter of any Examples 46-51, wherein the first and/or the second display is a touch display.

Example 55 may include the subject matter of any Examples 46-51, wherein the gesture includes a swipe toward or away from the first display or the second display; a flick toward or away from the first display or the second display; a drag toward or away from the first display or the second display, a tap, or a multi-tap.

Example 56 may include the subject matter of any Examples 46-51, wherein means for causing the second display to wake or to sleep further includes means for transmitting one or more commands to the second display through a DisplayPort (DP) auxiliary (AUX) channel or through sideband signaling.

Example 57 may include the subject matter of any Examples 46-51, further comprising means for identifying the current state of the second display.

Example 58 may include the subject matter of Example 46, wherein the gesture is made on the second display towards the first display.

Example 59 may include the subject matter of Example 58, further comprising means for causing an image displayed on the first display to be changed.

Example 60 may include the subject matter of Example 46, further comprising means for identifying a gesture made on the first display or on the second display.

The invention claimed is:

1. An apparatus comprising:
one or more processors;
a plurality of displays communicatively coupled to the one or more processors to display images; and
a device display manager (DDM) communicatively coupled to the one or more processors to:
receive an identification of a gesture made on a first of the plurality of displays; and
cause a second of the plurality of displays to enter a sleep state or an awake state based at least in part on the identified gesture and a current state of the second display, the first and second displays being different displays;
wherein if the identified gesture indicates to an application to no longer display an image on the second display and a current state of the second display being the awake state, then the DDM is to cause the second display to enter the sleep state.

2. The apparatus of claim 1, wherein if the identified gesture indicates that the second display is to enter the sleep state, and a current state of the second display is the awake state, then the DDM is further to cause the second display to enter the sleep state.

3. The apparatus of claim 1, wherein if the identified gesture indicates that the second display is to enter the awake state, and a current state of the second display is the sleep state, then the DDM is further to cause the second display to enter the awake state.

4. The apparatus of claim 1, wherein if the identified gesture indicates to an application to display an image on the second display, and a current state of the second display is the sleep state, then the DDM is to cause the second display to enter the awake state.

5. The apparatus of claim 1, wherein to cause the second display to enter the sleep state further includes to cause the second display to enter the sleep state unless the application or another application running on the one or more processors is to display another image on the second display.

6. The apparatus of claim 1, wherein the first or the second display is a touch display.

7. The apparatus of claim 1, wherein the gesture includes a swipe toward or away from the first display or the second display; a flick toward or away from the first display or the second display; a drag toward or away from the first display or the second display, a tap, or a multi-tap.

8. The apparatus of claim 1, wherein to cause the second display to enter the awake or the sleep state further includes to transmit one or more commands to the second display through a DisplayPort (DP) auxiliary (AUX) channel or through sideband signaling.

9. The apparatus of claim 1, wherein the current state of the second display is identified by the DDM.

10. The apparatus of claim 1, wherein the gesture is made on the second display towards the first display.

11. The apparatus of claim 10, further comprising cause an image displayed on the first display to be changed.

12. The apparatus of claim 1, wherein the DDM further comprises a gesture analyzer to identify a gesture made on the first display or on the second display.

13. A method for controlling a display, comprising
identifying a gesture made on a first display of a plurality of displays; and
causing a second display of the plurality of displays to enter a sleep state or to enter an awake state based at least in part on the identified gesture and a current state of the second display, the first and second displays being different displays;
wherein if the identified gesture indicates to an application to display an image on the second display and a state of the second display is in the sleep state, then causing the second display to wake.

14. The method of claim 13, wherein causing a second display of the plurality of displays to enter a sleep state or to enter an awake state further includes:
if the identified gesture indicates that the second display is to enter the sleep state and a current state of the second display is in the awake state, then causing the second display to enter the sleep state;
if the identified gesture indicates that the second display is to enter the awake state and a current state of the second display is the sleep state, then causing the second display to enter the awake state;
if the identified gesture indicates to the application to no longer display an image on the second display and a current state of the second display is the awake state, then causing the second display to enter the sleep state; or
causing the second display to enter the sleep state unless the application or another application running on one or more processors is to display another image on the second display.

15. The method of claim 14, wherein the gesture includes a swipe toward or away from the first display or the second display; a flick toward or away from the first display or the second display; a drag toward or away from the first display or the second display, a tap, or a multi-tap.

16. One or more non-transitory computer-readable media comprising instructions that cause a computing device, in response to execution of the instructions by the computing device, to:
identify a gesture made on a first display of a plurality of displays; and
cause a second display of the plurality of displays to enter a sleep state or to enter an awake state based at least in part on the identified gesture and a current state of the second display, the first and second displays being different displays;
wherein if the identified gesture indicates to an application to no longer display an image on the second display and a state of the second display is the awake state, then to cause the second display to enter the sleep state.

17. The one or more non-transitory computer-readable media of claim 16, wherein to cause a second display of the plurality of displays to enter a sleep state or to enter an awake state further includes:
if the identified gesture indicates that the second display is to enter the sleep state and a current state of the second display is the awake state, then to cause the second display to enter the sleep state;
if the identified gesture indicates that the second display is to enter the awake state and a current state of the second display is the sleep state, then to cause the second display to enter the awake state;
if the identified gesture indicates to the application to display an image on the second display and a current state of the second display is the sleep state, then to cause the second display to enter the awake state; or
cause the second display to enter the sleep state unless the application or another application running on one or more processors is to display another image on the second display.

18. The one or more non-transitory computer-readable media of claim 16, wherein the first display or the second display is a touch display.

19. The one or more non-transitory computer-readable media of claim 16, wherein the gesture includes a swipe toward or away from the first display or the second display; a flick toward or away from the first display or the second display; a drag toward or away from the first display or the second display, a tap, or a multi-tap.

20. The one or more non-transitory computer-readable media of claim 16, wherein to cause the second display to enter the awake state or to enter the sleep state further includes to transmit one or more commands to the second display through a DisplayPort (DP) auxiliary (AUX) channel or through sideband signaling.

* * * * *